March 20, 1951 O. W. HENRIKSON ET AL 2,546,070

PLUNGER RELEASE LEVER

Filed Aug. 26, 1946 2 Sheets-Sheet 1

INVENTORS.
OSCAR W. HENRIKSON
ROBERT L. SARGISSON

BY

ATTORNEY

March 20, 1951 O. W. HENRIKSON ET AL 2,546,070

PLUNGER RELEASE LEVER

Filed Aug. 26, 1946 2 Sheets-Sheet 2

*INVENTORS.*
OSCAR W. HENRIKSON
ROBERT L. SARGISSON

*BY* Chas. W. Candy

ATTORNEY

Patented Mar. 20, 1951 2,546,070

UNITED STATES PATENT OFFICE 2,546,070

PLUNGER RELEASE LEVER

Oscar W. Henrikson, Chicago, and Robert L. Sargisson, Berwyn, Ill., assignors to Automatic Electric Laboratories, Inc., Chicago, Ill., a corporation of Delaware Application September 26, 1946, Serial No. 699,552

3 Claims. (Cl. 179—164)

The present invention relates in general to telephone sets but more particularly to improvements in the self-contained handset type such as Patent No. 2,272,474 issued February 10, 1942. It will be noted that in the older forms of this type of instrument, the cradle switch included a single operating plunger or button extending exteriorly of the base member and arranged to control the operation of the cradle switch contact springs mounted within the base member. More recently, two buttons or plungers have been employed, such as in Patent No. 2,272,474, these plungers being positioned between the prongs or posts forming a part of the cradle for supporting the handset. One of these plungers is positioned between the two posts on the left side of the top of the case and the other plunger positioned between the two posts on the right side.

It is the object of the present invention to provide two plungers, one of which is in a novel combination with a plunger release lever. This plunger is positioned between the two right hand posts of the cradle as previously mentioned, and may rest in any one of three positions: first, fully depressed when the handset is resting in the cradle; second, approximately half way, or mid-position between maximum height and fully depressed and; thirdly, fully operated to its highest position when the handset is in use. This plunger moves from fully depressed position to the mid-position after the handset is removed from the cradle and remains in this mid-position until the release plunger lever has been operated manually. In the mid-position of the plunger, a part of the telephone circuit (not shown) is closed, connecting the receiver to the line enabling the calling subscriber to listen on the line, to determine its condition.

It is desirable on telephone lines which have more than one telephone, to furnish a telephone instrument which will enable a calling subscriber to ascertain whether or not the line is engaged on another conversation, before attempting to initiate a call. It is necessary also in automatic telephone systems, that the lifting of a receiver, or handset, off the cradle at one of the telephones of a line for determining the condition of the line, shall not interfere with the dialed impulses which at that instant are being transmitted over the line from one of the other telephones. It is one of the objects of this invention to provide means to accomplish the desired result.

When using a telephone equipped with the release plunger and release plunger lever of this invention, a subscriber would lift the handset from the cradle and place the receiver to his ear. The release plunger would move from its fully depressed position to a position approximately half way between fully depressed and maximum height, there it will rest under the control of the release plunger lever. In this position the release plunger holds the cradle switch spring set in such a position that one contact is closed and the receiver of the handset is connected into the circuit in such a manner that the calling subscriber can listen to determine the condition of the line. Should the line be in use by another subscriber, his conversation will not be disturbed and the calling party may return his handset to the cradle and wait a reasonable length of time. However, if the line is in condition to receive his call, the calling party will press the release lever, which releases the plunger allowing it to rise under pressure from the spring of the cradle switch spring assembly, to its highest, or so called third position. The telephone will now function in the ordinary manner. In the event that the calling party dials through to an operator at a toll switchboard or other manual telephone switchboard and desires to signal the operator by the usual method of moving the cradle hook up and down, the calling party would operate the plunger on the left side of the cradle, which would have no effect on the release plunger or the release plunger lever on the right side of the cradle.

The special parts required, to apply the objects of this invention to a cradle type automatic telephone instrument of the two plunger type, such as the instrument disclosed in Patent 2,272,474, are designed in such a manner that such existing telephones can be converted, by the removal of a certain number of parts and the substitution of parts of this invention, without any structural alterations.

The novel features believed to be characteristic of this invention are set forth in the following specification and will be readily understood when read in connection with the drawings consisting of 9 figures on 1 sheet, as follows.

Figure 1:
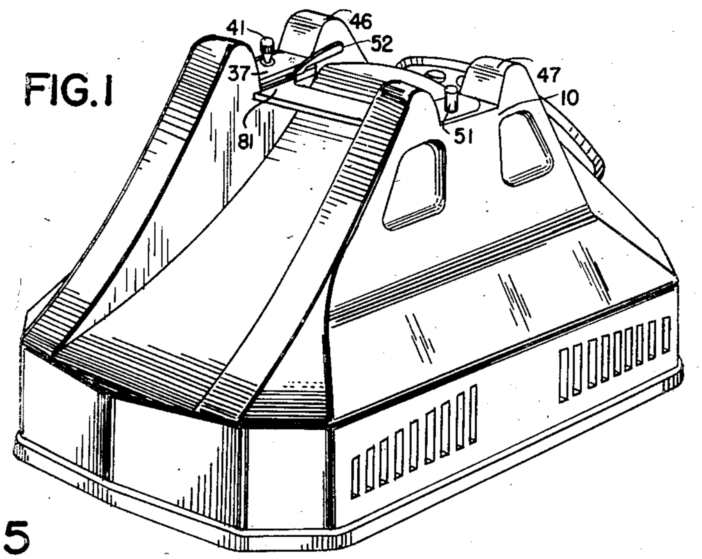
Figure 1 illustrates in perspective the general appearance of the improved telephone set having embodied therein the features of this invention, but without the handset.

Referring now more particularly to Figure 1, the cover portion of the desk set is formed of a suitable plastic insulating compound or phenolic condensation product which lends itself readily to moulding so that all of the parts may be formed into the desirable shape. The cover is generally in the shape of a truncated pyramid having a sloping front on which the dial (or calling device) is mounted, or in certain types of desk sets, the dial is supported in correct relation with the sloping front by a bracket attached to the base of the instrument. The top part of the cradle portion of the case is formed, not unlike four posts or pillars, two on the left and two on the right, between which the handset rests when not in use. In this position the weight of the handset (not shown) holds down two plungers, either of which will, when pressed down, cause the operation of the cradle switch springs. A plate 81 or block grip is provided which spans the distance from the pillars on the left to the pillars on the right, forming a handle or grip by which the telephone instrument can be lifted, when being moved from place to place, and having openings at either end forming bearings for the plungers. These plungers operate the known switching springs as shown in detail in U. S. Patent 2,272,474.

Figure 2:
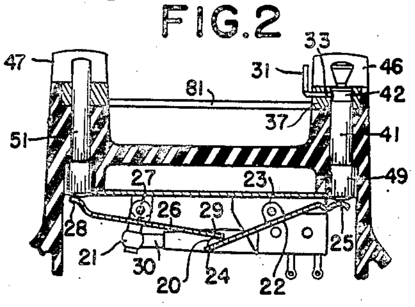
Figure 2 is a view, partly in section taken from the rear of Figure 1 of the telephone set of Figure 1 showing the release plunger resting in third, or fully operated position.

Figure 2 is a front view, partly in section, showing details of the cradle switch, comprising two operating plungers 41 and 51, which protrude through the top of the case 10, one on the left hand side between two posts 47, one of which is not shown, and one on the right between two other posts 46, one of which is not shown, the latter plunger 41 being the release plunger of this invention. These plungers are arranged to be engaged by operating levers 22 and 26 pivotally mounted within the case. The latter lever 26 carries two round insulators 21, one of which is not shown, for engaging two movable springs 30 (one of which is not shown), of the cradle switch spring set. The plungers 41 and 51 are slidable within the bearing surface formed by openings extending through the case 10 and through the block grip 37 and positioned midway between the posts, as previously mentioned. Their upward movement is by the force exerted by the tension of movable springs 30, of the spring set, and their downward movement against spring pressure is caused by the weight of the handset when it is returned to the cradle after being used. To limit the upward movement of these plungers 41 and 51, each is provided with an enlarged head, such as 49 in Figure 4, which rests against a shoulder in the lower end of the hole through the case, on the underneath side of the top of the case 10.

It will be seen in Figure 2 that each of the operating levers 22 and 26, is pivoted intermediate its two ends, such as pivots 23 and 27, the arrangement being such that the inner end 24 of lever 22 overlaps the inner end 29 of lever 26.

Figures 3, 5, 6, 7, 8, 9:
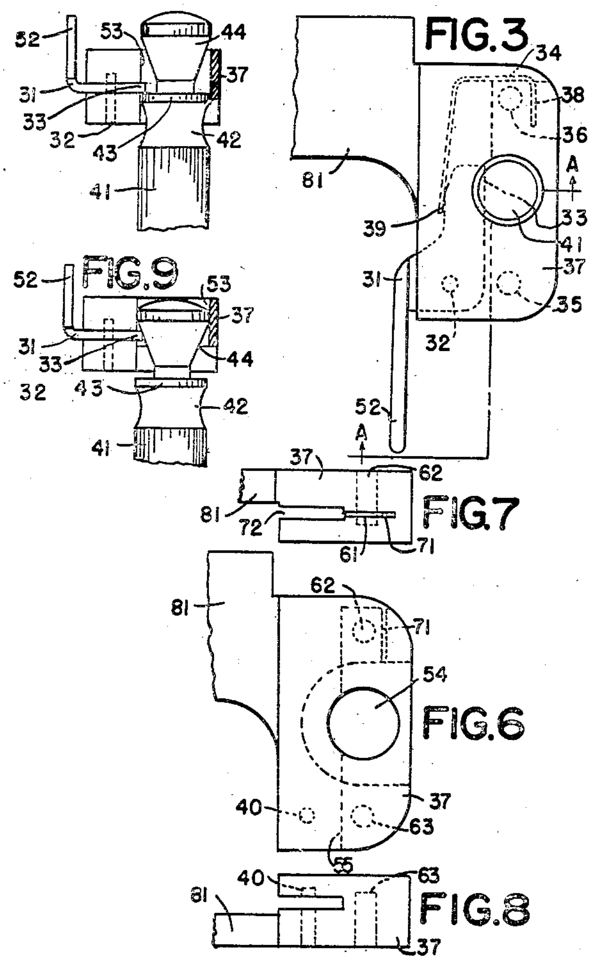
Figure 3 is a view looking down on the right hand end of the plunger mounting block showing the release plunger lever and spring.
Figure 5 is a partial section on a line AA of Figure 3 with the release plunger shown in full in its mid-position.
Figure 6 is another top view of the right end of the block showing the relation of the mounting holes and the opening for the release plunger.
Figure 7 is a view taken from the top of Figure 6 showing the detailed arrangement for anchoring the release plunger lever spring.
Figure 8 is a view taken from the bottom of Figure 6 showing the position of the hole for the release plunger lever pivot.
Figure 9 is similar to Figure 5, however the plunger is shown in the fully depressed position.

The movable springs 30 are biased toward each other so that the cam portion thereof, not shown, exerts a force on the round insulators 21, tending to rotate the lever 26 about the pivot 27 in a clockwise direction, as seen in Figure 2. It should be noted at this point that, although in the earlier designed telephone sets using two plungers, such as Patent 2,272,474, the two plungers were of the same design, whereas in this invention the left plunger 51 is similar to the earlier types but the right hand plunger 41, is of special design, especially the top end, which appears quite clear in Figure 5, which shows plunger 41 in its second position. When the handset is removed from the cradle, thereby removing the weight from both plungers, the upward movement of plunger 51 is not retarded, but plunger 41 can move only from its fully depressed position, as seen in Figure 9, to its second position, as seen in Figure 5, and its shoulder 43 comes to rest on the underneath side of engaging end 33 of the release lever 31. At this point the end 25 of lever 22 has moved up approximately one half its total distance, therefore the end 29 of lever 26 is prevented from completing its full movement, with the result that the bushings 21 are held in such a position that the movable springs 30 can move just far enough to close only one of the contacts of the spring set. As previously mentioned, the circuit to the receiver (not shown) is closed and the calling subscriber may listen to determine the condition of the line. The plunger 41 can be released from the second, or mid position, and be free to move up to complete its upward stroke, by a manual movement to the right as seen in Figure 3, of the free end 52, of the release lever 31.

In Figure 2 the mounting block and grip assembly 81 may be seen, spanning the distance from the left pillars 47 (one of which is not shown) and the pillars 46 (one of which is not shown), which serves as a hand grip by which the telephone set can be carried from place to place.

Figure 3 is a top view of the mounting block 37, of the right hand side of the set, located between two of the posts 46 of the cradle, showing the release plunger lever 31, the release lever retaining spring 34, in their relation to the release plunger 41. It will be understood that release lever 31 is rotatable on the pivot 32 and when the free end 52 is manually moved to the right (as seen in Figure 3), the engaging end 33 moves to the left. The retaining spring 34 is tensioned to exert a force to retain the engaging end 33, of the release lever 31, in engagement with the release plunger 41. In the position shown in Figure 3, the release plunger 41 is completely depressed and the engaging end 33 is therefore resting against the sloping surface 44 of the release plunger 41. The end 38 of the release lever retaining spring 34 shown dotted in Figure 3 fits snugly in a hole 71 (seen in Figure 7) and part of the free portion of the spring lies in slot 61 and the balance in slot 72 (as seen in Figure 7) with the free end 39 pressing against the engaging end 33 of the release lever 31. The end of the release lever pivot 32 is shown dotted in Figure 3, as well as the ends of two mounting block screws 35 and 36, as these do not come to the top surface of the mounting block 37, this feature is also indicated in Figures 7 and 8, where the hole 40 for the pivot 32 and holes 62 and 63 for the mounting block screws are shown.

Figure 4:
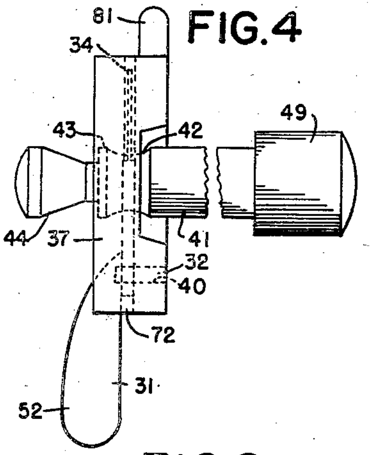
Figure 4 is an end view of the block taken from the right of Figure 3.

Referring to Figure 4 the relation of the several parts in this mounting block assembly 37 may be seen. The release lever retaining spring 34, is indicated by the dotted lines. In this view, the enlarged lower end 49 of release plunger 41, is shown.

Figure 5 shows the release plunger 41 in the second or mid-position. This view indicates the position of the plunger 41, just after the handset has been removed from the cradle. Plunger 41, forced upwards by lever 22 under spring pressure from the cradle switch spring assembly, has come to rest by the lever shoulder 43 meeting the engaging end 33 of the release lever 31. The plunger 41 will remain in this position and the receiver of the telephone set will be connected to the line (not shown) until the free end 52 of the release lever 31 has been moved to the right to release the plunger, or until the handset is returned to the cradle. By reference to Figure 5, it will be seen that a movement to the right of the free end 52 of the release lever 31, will cause the lever to rotate on the pivot 32 and in turn end 33 will move away from the plunger 41 and, when the end 33 has moved to the left until its edge is flush with the inside edge 53 of hole 54 the plunger will be free to continue its movement upwards, under spring pressure from the cradle switch spring assembly. When the release lever 31 has released the plunger 41 and the lever 22, under spring pressure has moved the plunger 41 to its highest position, the lever 26 has also moved plunger 51 to its highest position and the circuit of the telephone, not shown, is in calling and talking condition. It should be noted at this point that the plunger 51 may be pushed down manually without replacing the handset, and in turn causes the round insulators 21 to operate the movable springs 30 without interfering with lever 22 or the release plunger 41. The alternate operating and releasing of the plunger 51 is necessary when the calling party desires to signal an operator, and due to the arrangement whereby end 29 of lever 26 is above end 24 of lever 22, such signaling can be accomplished without disturbing the release lever or the release plunger.

Referring to Figures 6, 7 and 8 a slot 72 is provided for a part of the release lever and for the free movement of one end of the release lever retaining spring 34. Hole 54 in Figure 6 is for the top end of release plunger 41 and it will be noted by the dotted line 55 and from the views in Figures 7 and 8, that the slot 72 for the release lever 31 opens into the hole 54 to allow the engaging end 33 of lever 31 to close a sufficient part of hole 54, when plunger 41 is at normal, in fully depressed position, to stop the upward movement of plunger 41, by engaging the shoulder 43, when the handset is removed from the cradle. The dotted holes 62 and 63, which do not come through the top surface of mounting block, are threaded to receive the ends of the block mounting screws, not shown. The dotted hole 40 is to accommodate the pivot 32, which forms a bearing for release lever 31 for its manual movement in one direction and under spring pressure in the opposite direction.

As seen in Figure 9, the release plunger 41 is in its fully depressed position, or so called first position, and the other plungers 51, seen in Figure 2, will be fully depressed when the handset is resting in the cradle assembly on the top of the set.

Figure 10:
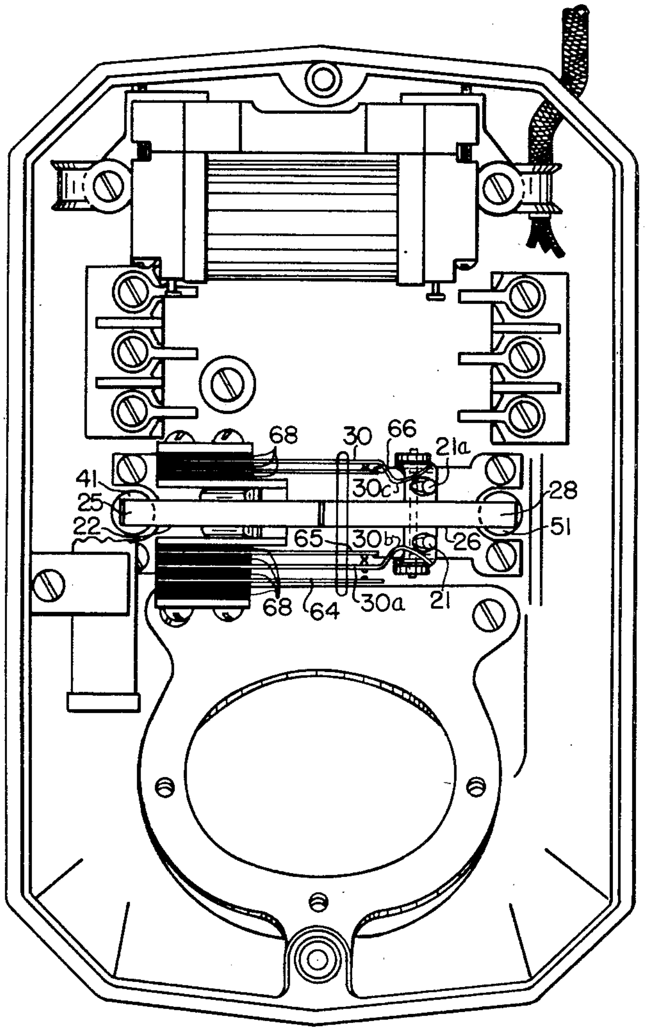
Figure 10 is a bottom view of the instrument as shown in Fig. 1 and shows more particularly the interaction of plungers, levers and contact springs.

Referring now in greater detail to Fig. 10, the co-operation of the pair of plungers 41 and 51 with the cradle switch springs 30 and 30*a* is seen, the detailed construction of the release plunger 41 and its interaction with the lever having been adequately described hereinbefore with relation to Figs. 3–9. These plungers both extend thru the base 10 and are respectively arranged to be engaged by pivotally mounted operating levers 26 and 22, the first of which carries a pair of fingers 21 and 21*a* for engaging the movable springs 30 and 30*a* respectively of the cradle switch spring assembly. The plungers, as explained before, are longitudinally slidable within the bearing surface formed by an opening extending thru the base 10 and midway between the cradle prongs 46 and 47. The springs of the assembly and the two levers 26 and 22 are supported upon a bracket piece which is mounted within the base 10. The spring assembly comprises in addition to movable springs 30 and 30*a*, a pair of springs 64 and 65 associated with movable spring 30*a* and a spring 66 associated with movable spring 30. The spring assembly is also mounted upon the bracket piece within the base 10. The springs are insulated from one another as well as from the bracket piece by insulators 68 in well known manner.

Each of the operating levers is pivoted intermediate its ends as explained hereinbefore. The left end of lever 26 is provided with a curved portion 28 which is adapted to be engaged by the lower end of plunger 51.

The right end of lever 22 is provided with a curved portion 25 and is adapted to be engaged by the lower end of release plunger 41. Movable spring 30*a* has at its free end a cam shaped portion 30*b* adapted to engage a roller formed of insulating material and mounted on the operating finger 21*a*. Similarly, the other movable spring 30 is provided at its free end extremity with a cam shaped portion 30*c* adapted to engage a roller mounted on finger 21. The two movable contact springs 30 and 30*a* are biased toward each other so that the cam portions thereof exert forces on the fingers 21 and 21*a* tending to pivot the lever 26 about its pivot 27 in a clockwise direction.

Thus, if plunger 41 is held in its upper position by lever 26, and plunger 51 is depressed manually, lever 26 is pivoted counterclockwise about pin 27 and the fingers 21 and 21*a* in co-operation with cam portions 30*b* and 30*c* of springs 30*a* and 30 cause the last two mentioned springs to be moved to their normal positions. Since plunger 41 is held in its upper position, lever 22 will not follow. It is in this manner that the springs are independently operated by depression of plunger 51 when plunger 41 is locked in its upper position.

A more complete description of the cradle switch mechanism may be found in Patent No. 2,272,474, issued February 10, 1942 to Obergfell.

Having described the invention, what is considered to be novel is pointed out in the appended claims.

What is claimed is:

1. In a cradle telephone set including a handset, a cradle for said handset, switching springs in said telephone set, a pair of plungers operated by replacement of said handset on said cradle for fully operating said switch springs in one direction, tension in said switch springs urging said plungers upwards in response to the removal of said handset from said cradle, a hand lever rotatably mounted in said cradle, a spring tensioned against said lever to actuate said lever into engagement with one of said plungers, a shoulder on said one plunger for engagement with said lever to hold said one plunger in mid position when said plungers are urged upwards by said switch spring in response to the removal of said handset from said cradle to thereby permit only a partial operation of said switch springs in the other direction, an extension on said lever manually operative to disengage said lever from said shoulder to release said one plunger to thereby cause said switch springs to move said one plunger upwards from said mid position to its fully operated position and to fully operate said switch springs in said other direction, and a curved notch in said one plunger in its fully operated position engaged by said lever when said lever is manually released for maintaining said one plunger in its fully operated position while said other plunger is manually operated to intermittently and fully operate said switch springs in both said directions.

2. In a cradle type telephone set including a handset, a cradle for said handset, switch springs in said telephone set, a plunger in said cradle operated by replacement of said handset on said cradle for fully actuating said switch springs in one direction, tension in said switch springs urging said plunger upwards in response to the removal of said handset from said cradle, a slot in said cradle, a hand lever rotatably mounted within said slot, a spring tensioned against said lever to actuate said lever into engagement with said plunger, a shoulder on said plunger operated into engagement with said lever to stop said plunger in mid position in response to the removal of said handset from said cradle and to thereby only partially operate said switch springs in the other direction, said lever manually operative to disengage said lever from said shoulder to release said plunger and cause said switch springs to move said plunger from said mid position to its fully operated position and to fully operate said switch springs in said other direction, and a curved notch in said plunger in its fully operated position engaged by said lever when said lever is manually released for maintaining said plunger in its fully operated position until said handset is replaced on said cradle.

3. In a cradle type telephone set including a handset, a pair of plungers in said cradle, switch springs in said telephone set, tension in said springs urging said plungers upward, a hand lever mounted upon said telephone set, a spring tensioned against said lever to urge said lever into engagement with a particular one of said plungers, said particular one plunger being tubular in shape and having a shoulder near one end to limit its upward movement under said switch spring tension, another shoulder on said particular plunger near its other end for engaging said lever and stopping said one particular plunger in mid position thereby only partially operating said switch springs, said other end comprising an inverted truncated cone shaped knob forming a recess for said lever adjacent said other shoulder, and a curved notch below said other shoulder for engaging said lever cooperating therewith to hold said one plunger in its uppermost position.

OSCAR W. HENRIKSON.
ROBERT L. SARGISSON.

REFERENCES CITED

The following references are of record in the file of this patent:

UNITED STATES PATENTS

| Number | Name | Date |
|---|---|---|
| 1,226,389 | Schulz | May 15, 1917 |
| 1,432,883 | Lysons | Oct. 24, 1922 |
| 1,584,010 | Clarke | May 11, 1926 |
| 2,218,328 | Curran | Oct. 15, 1940 |
| 2,234,650 | Obergfell | Mar. 11, 1941 |
| 2,272,474 | Obergfell | Feb. 10, 1942 |
| 2,326,591 | White | Aug. 10, 1943 |